United States Patent
van Nee et al.

(10) Patent No.: US 9,577,728 B1
(45) Date of Patent: Feb. 21, 2017

(54) MULTIPLE USER MIMO RATE PREDICTION BASED ON SINGLE USER SNR FEEDBACK

(71) Applicant: QUALCOMM Incorporated, San Diego, CA (US)

(72) Inventors: Didier Johannes Richard van Nee, Tull en 't Waal (NL); Ahmed Ragab Elsherif, Santa Clara, CA (US); Albert van Zelst, Woerden (NL); Qinghai Gao, Sunnyvale, CA (US); Vincent Knowles Jones, IV, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/866,224

(22) Filed: Sep. 25, 2015

(51) Int. Cl.
 *H04B 7/04* (2006.01)
 *H04L 12/26* (2006.01)

(52) U.S. Cl.
 CPC .......... *H04B 7/0452* (2013.01); *H04B 7/0417* (2013.01); *H04L 43/16* (2013.01)

(58) Field of Classification Search
 CPC .... H04L 1/0009; H04L 1/0003; H04L 1/0026; H04L 5/0037; H04L 1/20; H04L 5/006; H04L 27/2601; H04L 47/2433; H04L 43/16; H04B 7/0632; H04B 7/0452; H04B 17/24; H04B 17/336; H04B 7/0617; H04B 7/0417; H04W 24/10
 See application file for complete search history.

(56) References Cited

U.S. PATENT DOCUMENTS

2004/0001429 A1\* 1/2004 Ma ........................ H04J 11/00
                                                    370/210
2012/0063336 A1   3/2012 Shany et al.
(Continued)

FOREIGN PATENT DOCUMENTS

EP        2819313 A1    12/2014
WO   WO-2008143566 A1  11/2008
(Continued)

OTHER PUBLICATIONS

ISA/EP, International Search Report and Written Opinion of the International Searching Authority, Int'l Application No. PCT/US2016/049041, Nov. 18, 2016, European Patent Office, Rijswijk, NL, 15 pgs.

*Primary Examiner* — Vineeta Panwalkar
(74) *Attorney, Agent, or Firm* — Holland & Hart LLP

(57) ABSTRACT

Methods, systems, and devices are described for wireless communication. An access point (AP) may determine a single user bias for a wireless device based on a feedback signal-to-noise ratio (SNR) and an SNR based on a modulation and coding scheme (MCS). The AP may also determine a multi-user SNR for the wireless device based on the feedback SNR, the single user bias, a multi user loss, and a group bias. The AP may then select an updated MCS based on the multi-user SNR. In some cases, the AP may transmit a reference signal to the wireless device and receive a compressed beamforming feedback report from the wireless device based on the reference signal. The feedback SNR may be based on the compressed beamforming feedback report. The AP may also maintain a blacklist of groups with channel correlation that satisfies a threshold, and refrain from scheduling those groups together.

30 Claims, 11 Drawing Sheets

(56) References Cited

U.S. PATENT DOCUMENTS

2014/0362810 A1* 12/2014 Shirani-Mehr ...... H04B 7/0452
                                                    370/329
2015/0110046 A1   4/2015 Merlin et al.
2015/0117325 A1   4/2015 Ponnuswamy
2015/0156794 A1   6/2015 Kwon et al.
2015/0173014 A1   6/2015 Lee et al.
2015/0373572 A1* 12/2015 Sahin ................ H04W 72/1231
                                                    370/252

FOREIGN PATENT DOCUMENTS

WO   WO-2010121385 A1   10/2010
WO   WO-2015095844 A1   6/2015

* cited by examiner

MULTIPLE USER MIMO RATE PREDICTION BASED ON SINGLE USER SNR FEEDBACK

BACKGROUND

The following relates generally to wireless communication, and more specifically to multi-user multiple-input, multiple-output (MU-MIMO) rate prediction based on single user (SU) signal-to-noise ratio (SNR) feedback. That is, a rate implicit in a modulation and coding scheme (MCS) may be determined dynamically based on a feedback report.

Wireless communications systems are widely deployed to provide various types of communication content. Examples of communication content may include voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a wireless fidelity (Wi-Fi) (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

In some wireless systems, an AP may communicate with one or more grouped sets of client devices simultaneously. Multi-user groups may change, which may make a modulation and coding scheme (MCS) decision based on a packet error rate (PER)-based rate adaptation inaccurate. That is, multi-user MCS may depend on a multi-user grouping, thus the frequent grouping change may cause a rate adaptation loop to be inaccurate. Moreover, PER-based rate adaptation may be inaccurate in the presence of interference in sounding feedback.

SUMMARY

An access point (AP) communicating with multiple devices using multi-user multiple-input, multiple-output (MU-MIMO) operation may determine a user bias for a wireless representing the difference between a signal-to-noise ratio (SNR) implicit in a coding rate used for the device and an SNR based on a feedback report. The AP may also determine a multi-user SNR for the wireless device representing the impact of communicating within a group of devices. The multi-user SNR may be based on the feedback SNR, the single user bias, a multi user loss, and a group bias. The AP may then select an updated modulation and coding scheme (MCS) based on the multi-user SNR.

In some cases, the AP may transmit a reference signal to the wireless device and receive a compressed beamforming feedback report from the wireless device based on the reference signal. The feedback SNR may be based on the compressed beamforming feedback report. The AP may also maintain a blacklist of groups with channel correlation that satisfies a threshold, and refrain from scheduling those groups together.

A method of wireless communication is described. The method may include determining a single user bias for a wireless device based at least in part on a difference between a feedback signal-to-noise ratio (SNR) and a rate control SNR, wherein the feedback SNR is based at least in part on a compressed beamforming feedback report associated with the MU-MIMO operation and the rate control SNR is based at least in part on a first modulation and coding scheme (MCS), determining a multi-user SNR based at least in part on the single user bias and one or more parameters associated with a multi-user group of the MU-MIMO operation, and selecting a second MCS based at least in part on the multi-user SNR.

An apparatus for wireless communication is described. The apparatus may include means for determining a single user bias for a wireless device based at least in part on a difference between a feedback signal-to-noise ratio (SNR) and a rate control SNR, wherein the feedback SNR is based at least in part on a compressed beamforming feedback report associated with the MU-MIMO operation and the rate control SNR is based at least in part on a first modulation and coding scheme (MCS), means for determining a multi-user SNR based at least in part on the single user bias and one or more parameters associated with a multi-user group of the MU-MIMO operation, and means for selecting a second MCS based at least in part on the multi-user SNR.

A further apparatus for wireless communication is described. The apparatus may include a processor, memory in electronic communication with the processor, and instructions stored in the memory and operable, when executed by the processor, to cause the apparatus to determine a single user bias for a wireless device based at least in part on a difference between a feedback signal-to-noise ratio (SNR) and a rate control SNR, wherein the feedback SNR is based at least in part on a compressed beamforming feedback report associated with the MU-MIMO operation and the rate control SNR is based at least in part on a first modulation and coding scheme (MCS), determine a multi-user SNR based at least in part on the single user bias and one or more parameters associated with a multi-user group of the MU-MIMO operation, and select a second MCS based at least in part on the multi-user SNR.

A non-transitory computer-readable medium storing code for wireless communication is described. The code may include instructions executable to determine a single user bias for a wireless device based at least in part on a difference between a feedback signal-to-noise ratio (SNR) and a rate control SNR, wherein the feedback SNR is based at least in part on a compressed beamforming feedback report associated with the MU-MIMO operation and the rate control SNR is based at least in part on a first modulation and coding scheme (MCS), determine a multi-user SNR based at least in part on the single user bias and one or more parameters associated with a multi-user group of the MU-MIMO operation, and select a second MCS based at least in part on the multi-user SNR.

Some examples of the method, apparatuses, or non-transitory computer-readable medium described herein may further include processes, features, means, or instructions for transmitting a reference signal to the wireless device, and receiving a compressed beamforming feedback report from the wireless device based at least in part on the reference signal, wherein the feedback SNR is based at least in part on the compressed beamforming feedback report. Additionally or alternatively, some examples may include processes, features, means, or instructions for determining that the one or more parameters exceeds a threshold, and refraining from scheduling the multi-user group based at least in part on the determination that the one or more parameters exceeds the threshold.

Some examples of the method, apparatuses, or non-transitory computer-readable medium described herein may further include processes, features, means, or instructions for maintaining a blacklist comprising the multi-user group, determining that a number of groups in the blacklist exceeds a list threshold, and removing the multi-user group from the blacklist based at least in part on an order the multi-user group was entered into the blacklist. Additionally or alternatively, some examples may include processes, features, means, or instructions for transmitting a message to the wireless device based at least in part on the second MCS.

In some examples of the method, apparatuses, or non-transitory computer-readable medium described herein, the single user bias is based at least in part on a combination of a previous single user bias and an updated single user bias estimate weighted according to a forgetting parameter. Additionally or alternatively, in some examples the first MCS is based at least in part on a packet error rate (PER) detected for communications with the wireless device.

In some examples of the method, apparatuses, or non-transitory computer-readable medium described herein, the multi-user SNR is based at least in part on a multi-user grouping loss. Additionally or alternatively, in some examples the one or more parameters comprises a group bias based at least in part on a packet error rate of the multi-user group.

In some examples of the method, apparatuses, or non-transitory computer-readable medium described herein, the one or more parameters comprises a group bias based at least in part on a previous group bias and a forgetting parameter.

BRIEF DESCRIPTION OF THE DRAWINGS

Aspects of the disclosure are described in reference to the following figures.

DETAILED DESCRIPTION

In some wireless systems, multi-user multiple-input and multiple-output (MU-MIMO) group identification (ID) overloading can result in a frequent change of user groups. Since the signal to interference plus noise ratio/modulation and coding scheme (SINR/MCS) attained by stations or access points (APs) in MU-MIMO operation may depend on the actual user grouping, the frequent grouping change might cause a rate adaptation loop to be inaccurate. For example, an MCS may depend on a packet error rate (PER) of a group that a device is no longer associated with. In addition, PER-based rate adaptation may be inaccurate in the presence of interference based on sounding feedback from other devices in the group.

The use of per stream signal-to-noise ratio (SNR) estimates from a compressed beamforming feedback (CBF) report may help reduce the impact of MU-MIMO related interference and may help estimate MU groups with large channel correlation and low MU signal-to-noise ratio (SNR). In some cases these groups may be blacklisted to reduce inefficiencies.

The following describes a method for estimating modulation and coding scheme (MCS) based on the per-stream single-user signal-to-noise ratio (SU-SNR) estimates in the compressed beamforming feedback (CBF) report in MU-MIMO transmission. First, the SNR feedback is used to recursively estimate a client bias (e.g., using a previous bias estimate and a forgetting parameter). Then the client bias may be used to estimate a MU SNR bias associated with transmitting to a specific user as part of a beamforming group.

In some cases, the AP may bias the SU-SNR feedback with a pre-calculated multi-user (MU) loss or an adaptively calculated client bias and MU group bias. The group bias may be based on a PER, and may also be recursively determined. Through the use of the predicted MU-SNR, the MCS can then be determined. The predicted MCS can be used to enhance PER-based rate adaptation and predict poor MU groups with channel correlation that satisfies a threshold. Poor MU groups may be blacklisted for a period of time.

Aspects of the disclosure are initially described in the context of a wireless communication system. Specific examples are then described for determining a group. These and other aspects of the disclosure are further illustrated by and described with reference to apparatus diagrams, system diagrams, and flowcharts that relate to MU-MIMO rate prediction based on SU signal-to-noise ratio (SNR) feedback.

Figure 1:
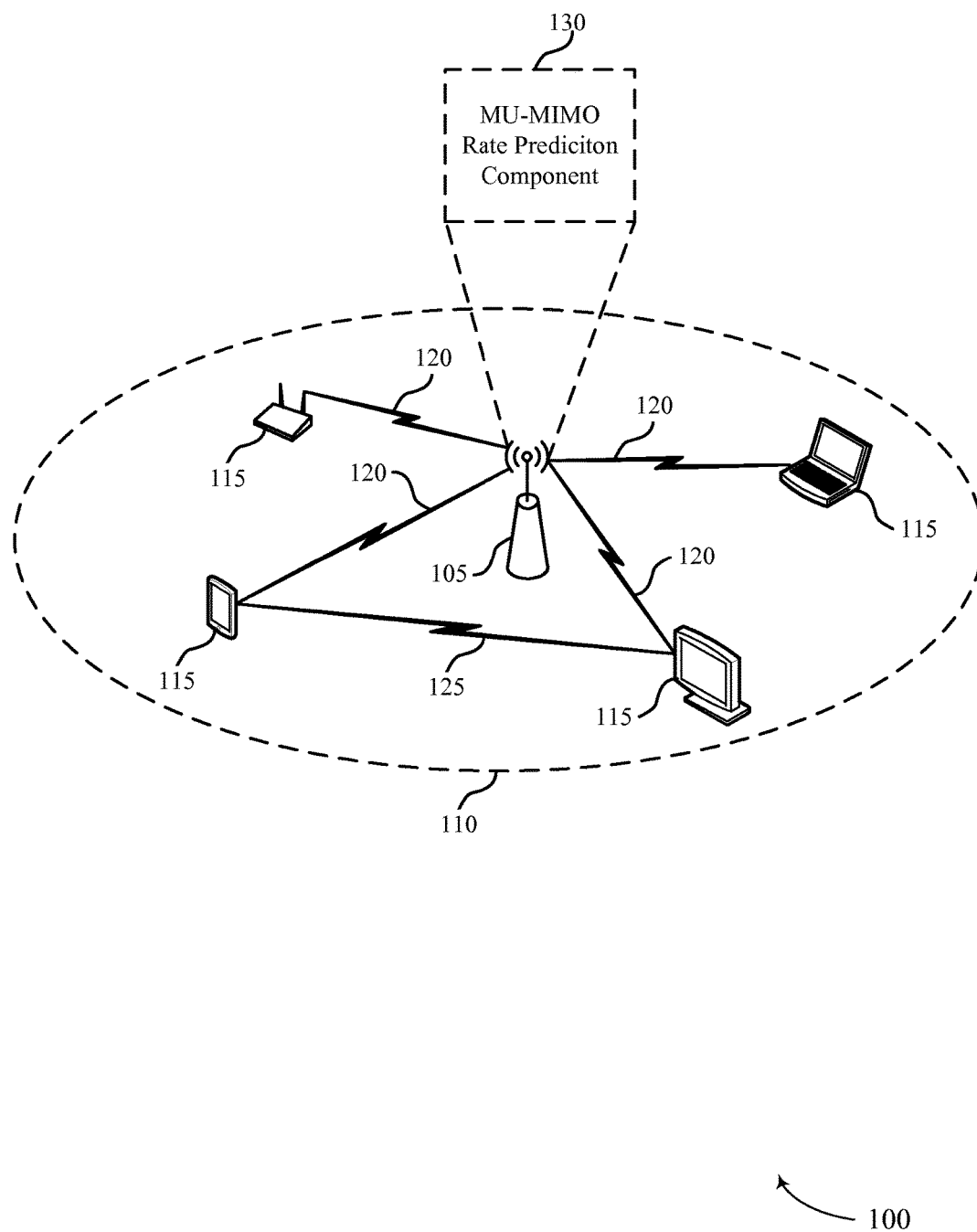
FIG. 1 illustrates a wireless local area network (WLAN) 100 (also known as a wireless fidelity (Wi-Fi) network) for MU-MIMO rate prediction based on SU signal-to-noise ratio (SNR) feedback configured in accordance with various aspects of the present disclosure

FIG. 1 illustrates a wireless local area network (WLAN) 100 (also known as a wireless fidelity (Wi-Fi) network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a BSS of the WLAN 100. An extended network station (not shown) associated with the WLAN 100 may be connected to a wired or wireless distribution system (DS) that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (DS) (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers. In other implementations, peer-to-peer connections or ad hoc networks may be implemented within WLAN 100.

Some wireless systems may have multi-user configurations based on transmitting and receiving with multiple antennas (i.e. multiple-input, multiple-output (MIMO) systems). A wireless system may utilize MIMO technology to increase packet throughput in the wireless system. An access point 105 in a MIMO system may include a MU-MIMO rate prediction component 130 to utilize a pilot signal and measure feedback to determine transmission parameters for a MIMO group in the MIMO system. For example, an access point may use feedback to measure a modulation and coding scheme (MCS). An access point may use the difference between the signal-to-noise ratio (SNR) of the feedback and the SNR corresponding to a current MCS value to estimate a single user bias.

An SNR may represent a ratio of useful information in a signal and random variation or interference from external sources. The bias may represent a difference in an SNR implicit in an MCS currently being used and an SNR computed based on a feedback report. A group, or multi-user, bias may be calculated based on a packet error rate (PER). The single user bias and the group bias may be used to estimate a multi-user (MU) SNR. The MU-SNR may be used to determine MCS, and may also be used to identify MU groups with enough bias to be banned from scheduling for a period of time.

Rate prediction may refer to a process of selecting a modulation and coding scheme appropriate a multi-user environment. Modulation is the process of representing a digital signal by modifying the properties of a periodic waveform (e.g., frequency, amplitude and phase). Demodulation takes a modified waveform and generates a digital signal. A modulated waveform may be divided into time units known as symbols. Each symbol may be modulated separately. In a wireless communication system that uses narrow frequency subcarriers to transmit distinct symbols, the modulation is accomplished by varying the phase and amplitude of each symbol. For example, a binary phase shift keying (BPSK) modulation scheme conveys information by alternating between waveforms that are transmitted with no phase offset or with a 180° offset (i.e., each symbol conveys a single bit of information). In a quadrature amplitude modulation (QAM) scheme, two carrier signals (known as the in-phase component, I, and the quadrature component, Q) may be transmitted with a phase offset of 90°, and each signal may be transmitted with specific amplitude selected from a finite set. The number of amplitude bins determines the number of bits that are conveyed by each symbol. For example, in a 16 QAM scheme, each carrier signal may have one of four amplitudes (e.g., −3, −1, 1, 3), which results in 16 possible combinations (i.e., 4 bits). The various possible combinations may be represented in a graph known as a constellation map, where the amplitude of the I component is represented on the horizontal axis and the Q component is represented on the vertical axis.

Figure 2:
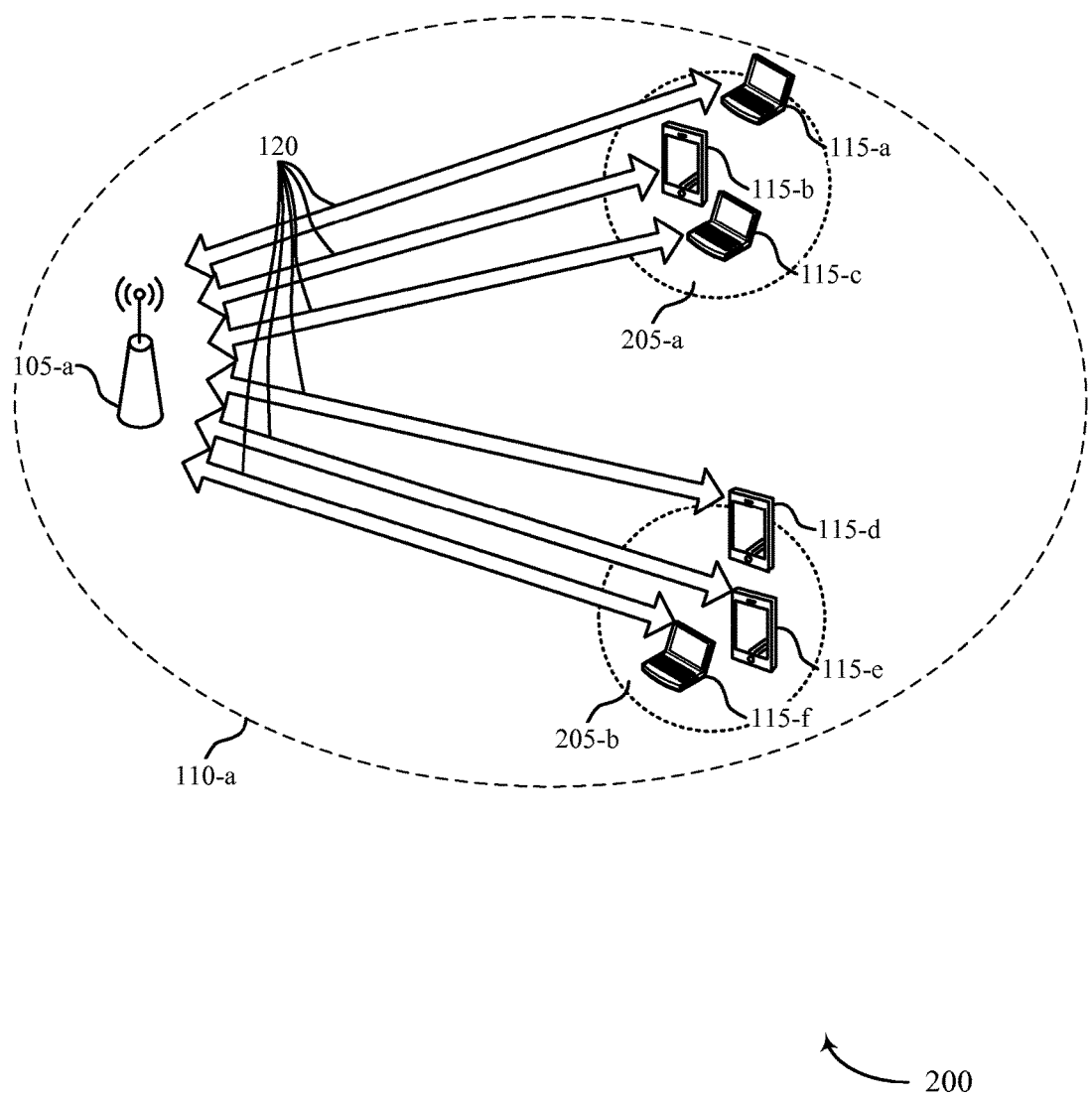
FIG. 2 illustrates an example of a wireless communications subsystem that supports MU-MIMO rate prediction based on SU SNR feedback in accordance with various aspects of the present disclosure.

Thus, an AP 105 may determine a single user bias for a STA 115 based on a feedback SNR and an SNR based on an MCS. The AP 105 may also determine a multi-user SNR for the STA 115 based on the feedback SNR, the single user bias, a multi user loss, and a group bias. The AP 105 may then select an updated MCS based on the multi-user SNR. In some cases, the AP 105 may transmit a reference signal to the wireless device and receive a compressed beamforming feedback report from the wireless device based on the reference signal. The feedback SNR may be based on the compressed beamforming feedback report. The AP 105 may also maintain a blacklist of groups with channel correlation that satisfies a threshold, and refrain from scheduling those groups FIG. 2 illustrates an example of a wireless communications subsystem 200 for MU-MIMO rate prediction based on SU SNR feedback. Wireless communications subsystem 200 may include AP 105-a and STA 115-a, 115-b, 115-c, 115-d, 115-e and 115-f, which may communicate over wireless links 120, and may be examples of the corresponding devices described with reference to FIG. 1.

Wireless communications subsystem 200 may support multi-user configurations based on transmitting and receiving with multiple antennas. For example, wireless communications subsystem 200 may utilize MIMO technology to increase packet throughput. AP 105-a may utilize a pilot signal and measure feedback to determine transmission parameters for a MU-MIMO groups 205-a and 205-b. For example, AP 105-a may use feedback to measure an MCS and use the difference between the SNR of the feedback and the SNR corresponding to a current MCS value to estimate a single user bias.

A group, or multi-user, bias may be calculated based on a packet error rate (PER). The single user bias and the group bias may be used to estimate a multi-user (MU) SNR. The MU-SNR may be used to determine MCS, and may also be used to identify MU-MIMO groups 205, such as MU-MIMO group 205-a or MU-MIMO group 205-b, with enough bias to be banned from scheduling for a period of time.

Multi-user groups may change frequently, which may make the MCS decision of the PER-based rate adaptation inaccurate. MU-MCS may depend on a multi-user grouping, thus the frequent grouping change may cause a rate adaptation loop to be inaccurate. Furthermore, the PER-based rate adaptation may be inaccurate in the presence of interference in sounding feedback.

Using SNR estimates per stream from a feedback report, for example from a compressed beamforming feedback (CBF) report, in a MU-MCS selection may reduce the impact of sounding with interference. Using SNR per stream estimates from the CBF report in the MU-MCS selection may also enable estimating poor quality MU-MIMO groups 205 with large channel correlation (e.g., if the channel correlation is greater than a threshold value), where the large channel correlation may lead to cross-user interface, and thus, an MU-SNR below a threshold. It may be appropriate to estimate a single user, or client, SNR bias, which may be done by comparing an open-loop rate to SNR in the feedback report. This method may utilize a look up table (LUT) that maps MCS to SNR.

In some cases, the MCS prediction may be based on the compressed channel feedback in the CBF report. If the MCS prediction is based on the compressed channel feedback in the CBF report, it may be appropriate to decompress the compressed feedback and compute a metric for the MCS prediction, which may involve hundreds of complex multiplications per MU group.

An SNR single user bias may be calculated as a difference between an SNR in a feedback report and an SNR for an MCS used by an open-loop rate control. A mapping between the MCS and the SNR may be stored in a LUT. The difference may be averaged over multiple feedback reports to obtain a more accurate single user bias and reduce the impact of interference.

For some MCS levels with a relatively low data rate (e.g., MCS9) it may not be appropriate to use a positive single user bias. For example, if 30 dB is a maximum readable value for the MCS, then a feedback SNR may actually be between 30 dB and 53.75 dB (i.e., the maximum value) if the calculated bias reads as zero. Thus, for some MCS levels, only a negative bias may be detected. For instance, if a feedback SNR is 27 dB while the SNR range associated with the MCS starts at 30 dB. To avoid a positive bias when using such an MCS, the bias estimate may be clipped to some value (e.g., 3 db). Although specific MCS and decibel values are used as examples, other values may also be used.

The single user, or client, bias may be formulated as follows:

$$\text{Client Bias} = \alpha(\text{Feedback SNR} - \text{SNR}(\text{Rate Control MCS})) + (1-\alpha) \cdot \text{Client Bias} \quad (1)$$

where $\alpha$ is a forgetting factor, where $0 \leq \alpha \leq 1$. The forgetting factor $\alpha$ may weigh the instantaneous difference between a feedback SNR and an SNR of an MCS used by an open-loop rate control against the history of the single user bias to reduce the impact of interference. The SNR(Rate Control MCS) may be the SNR corresponding to the current MCS value from the open-loop rate control (e.g., obtained from a LUT as described above). The initial single user bias may be set to zero.

The single user bias may be used to estimate a MU-SNR bias associated with transmitting to a specific STA 115 as part of a beamforming group. This may include biasing the SU-SNR feedback with pre-calculated multi-user loss and adaptively calculated single user bias and multi-user group bias. The single user bias may be calculated for each user in an MU-MIMO group 205 using the same calculation used for determining a single user, or client, bias as described above. Using the calculated single user bias, a predicted MU-SNR may be calculated. Predicted MU-SNR may be equated by:

$$\text{Predicted MU SNR} = \text{Feedback SNR} - \text{Client Bias} - (\text{MU loss} + \text{MU Group Bias}) \quad (2)$$

The predicted MU MCS may be obtained based on a predicted MU-SNR mapped to MCS in a LUT. Multi-user loss may be a predicted loss stored, for example, in a LUT. It may represent a signal loss of a user while communicating as a part of a multi-user group. A feedback SNR may be the result of an SNR if a beamformee (i.e., the device on the receiving end of the beamforming) applies a V matrix for single user beam-forming (SUBF). An average MU loss may be the difference between the MU-SNR and the SUBF SNR.

For example, in the case of a 4×2 multi-user configuration the average MU loss may be 5 dB. In another example, for a 4×3 multi-user configuration, the average MU loss may be 9 dB. MU loss may be the same for both one and two receive (RX) clients. The loss may depend on the MCS. For example, given an error vector magnitude (EVM) of −36 dBc (i.e., decibels relative to the carrier), an MCS may give a 6 dB loss for one configuration (e.g., 4×2 MU) and an 11 dB loss for another configuration (e.g., 4×3 MU). Alternatively, in another channel, MU loss may be 3 dB for one configuration (e.g., 4×2 MU) and 5 dB for another configuration (e.g., 4×3 MU). Although specific MIMO configurations and decibel values are used as examples, other configurations values may also be used.

A multi-user group bias may be adapted based on a measured PER for that MU-MIMO group 205 (i.e., the rate of packet loss). The multi-user group bias may also be recursively determined. That is, each stage of computing a new MU group bias may depend on the existing bias. The group bias may be calculated as:

$$\text{MU Group Bias} = \beta \cdot \text{dGB} + (1+\beta) \cdot \text{MU Group Bias} \quad (3)$$

where $\beta$ is a forgetting factor, where $0 \leq \beta \leq 1$, which may reduce the impact of interference. The initial MU group bias may be set to zero. The predicted MU-SNR may be determined using the MU group bias. Through the use of the predicted MU-SNR, an MCS may be determined. The predicted MCS may be used to enhance PER-based rate adaptation and predict poor quality MU groups with channel correlation that satisfies a threshold.

If the MU group bias of a specific MU-MIMO group 205 is above a predetermined level (i.e., the MU-MIMO group 205 has a high PER), the multi-user group may be deemed a blacklisted group. In some examples, a list may be kept of recently used MU-MIMO groups 205. The list may be limited, for example, to 64 groups in order to save memory. For each MU-MIMO group 205 in the list, an MU group bias may be calculated. Blacklisting a MU-MIMO group 205 may occur on the condition that the MU group bias may be greater than a certain threshold (e.g. 8 dB). A blacklisted multi-user group may be banned from scheduling for a period of time. After that time period, the blacklisted multi-user group may then be removed from the Blacklist and allowed to be scheduled again. If the list of recently used groups fills up, the least recently used group may be deleted, and a new group may be added to the list.

Enhanced rate adaptation may occur by using the predicted multi-user MCS for each STA 115 in an MU-MIMO group 205 for the first physical layer convergence procedure (PLCP) physical protocol data unit (PPDU) after sounding. The predicted MU MCS may be compared with the MCS from the PER-based rate adaptation loop. Instead of directly depending on the predicted MU MCS value (i.e., if that value is not accurate) the rate adaptation MCS for the first PPDU after sounding may be kept. Furthermore, the MCS prediction logic may be used to calculate the MU group bias. If the MU group bias indicates a blacklisted group, it may not be appropriate to use the corresponding PER in the rate adaptation loop; specifically, it may be appropriate to avoid contaminating the PER history used in the rate adaptation loop.

Figure 3:
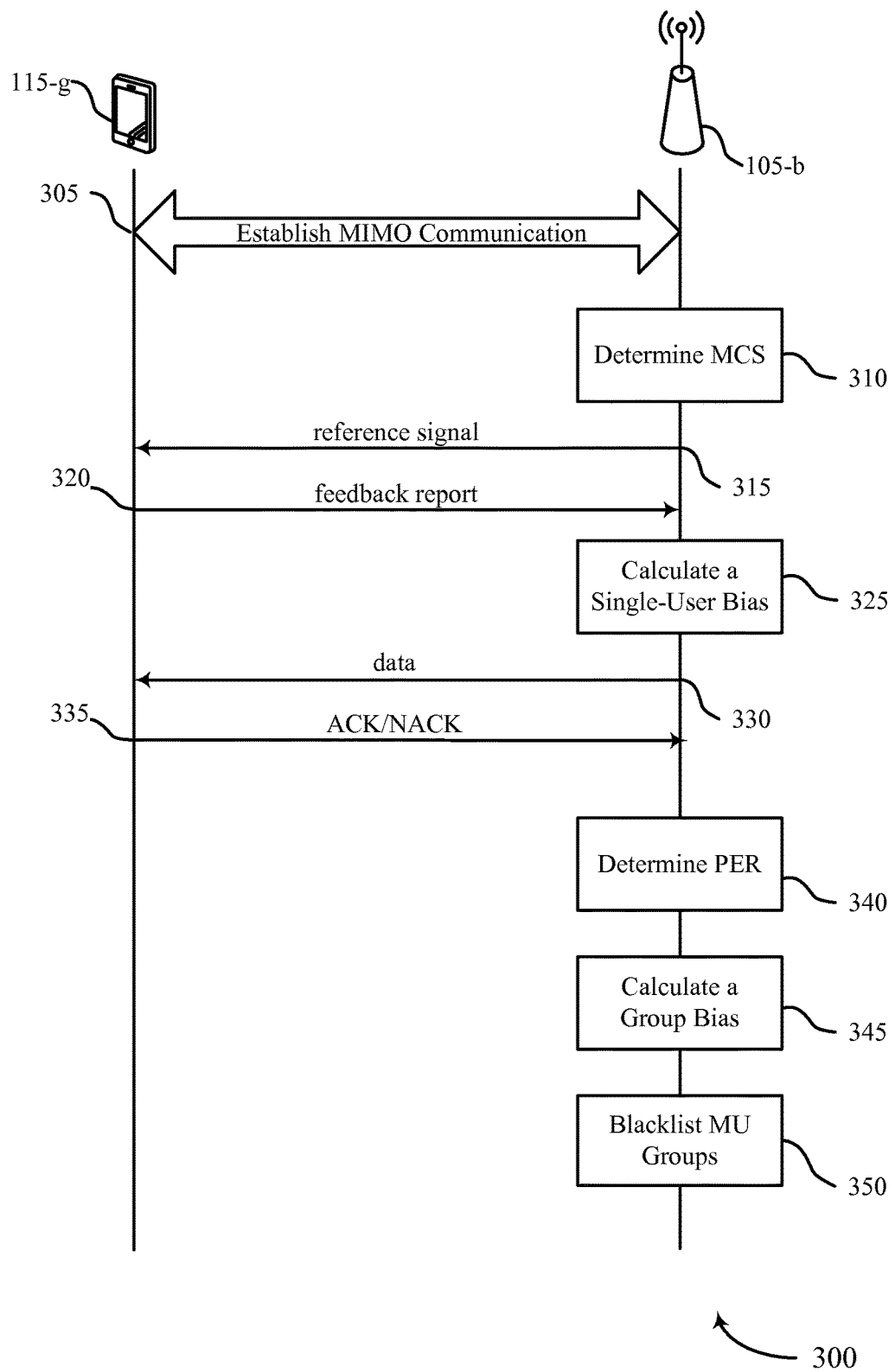
FIG. 3 illustrates an example of a process flow that supports MU-MIMO rate prediction based on SU SNR feedback in accordance with various aspects of the present disclosure.

FIG. 3 illustrates an example of a process flow 300 for MU-MIMO rate prediction based on SU SNR feedback in accordance with various aspects of the present disclosure. Process flow 300 may include AP 105-a and STA 115-g, which may be examples of the corresponding devices described with reference to FIG. 1-2.

At step 305, AP 105-b may establish communication with STA 115-g through a MIMO system. STA 115-g may be one of several wireless devices in communication, specifically in MIMO communication, with AP 105-b. At step 310, AP 105-b may determine an MCS for the MIMO communication. The MCS may be used to, at least partially, determine the data rate of the MIMO communication. The MCS may be determined based on the MIMO communication establishment of step 305.

At step 315, AP 105-*b* may send a reference signal to STA 115-*g*. The reference signal may be received by STA 115-*g*, which may generate a feedback report for AP 105-*b*. The feedback may be a compressed beamforming feedback report. The feedback report may include a signal-to-noise ratio for STA 115-*g*. At step 320, STA 115-*g* may send the feedback report to AP 105-*b*. The information in the feedback report may be based at least in part on the reference signal sent in step 315.

At step 325, AP 105-*b* may calculate a single user bias for STA 115-*g*. The single user bias may be based on the feedback report received by AP 105-*b* in step 320, specifically based on the SNR included in the feedback report. The single user bias may be, at least partially, based on a previous bias estimate and a forgetting parameter.

At step 330, AP 105-*b* may transmit data to STA 115-*g*. At step 335, AP 105-*b* may receive an acknowledgement signal from STA 115-*g*. The ACK/NACK signal may be used to determine a PER in step 340. The PER may be an indication of the communication quality, and may be used to calculate a group bias in step 345. The single user bias may also be used to calculate the group bias in step 345.

At step 350, AP 105-*b* may refrain from scheduling, or blacklist, a group of MUs associated with the group bias based on if the group bias exceeds a threshold. AP 105-*b* may maintain the blacklist through a least-recently-used algorithm; that is, the blacklist may determine if a number of groups in the blacklist exceeds a threshold, and, if so, may remove a group from the blacklist based on an order the multi-user group was entered into the blacklist. Groups may be removed from the blacklist after a period of time.

Figure 4:
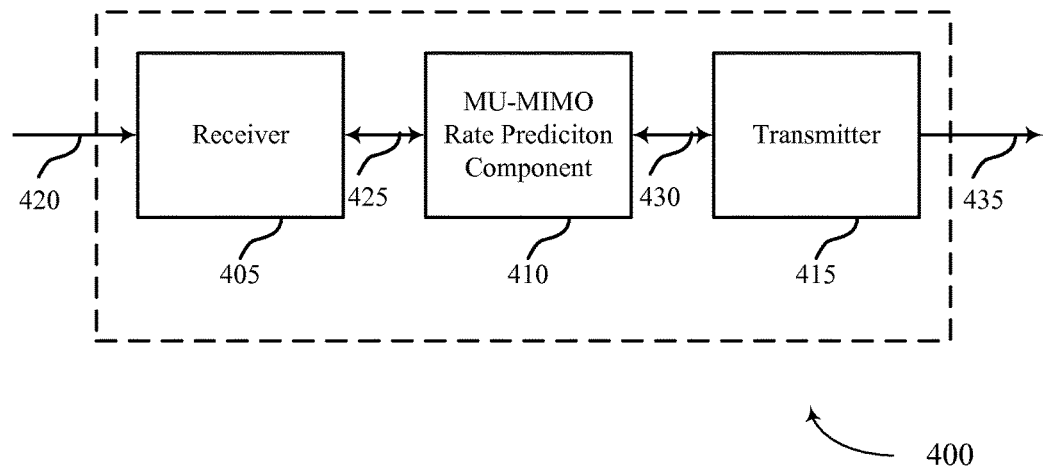
FIGS. 4-6 show block diagrams of a wireless device that supports MU-MIMO rate prediction based on SU SNR feedback in accordance with various aspects of the present disclosure.

FIG. 4 shows a block diagram of a wireless device 400 configured for MU-MIMO rate prediction based on SU SNR feedback in accordance with various aspects of the present disclosure. Wireless device 400 may be an example of aspects of an AP 105 described with reference to FIGS. 1-3. Wireless device 400 may include a receiver 405, a MU-MIMO rate prediction component 410, or a transmitter 415. Wireless device 400 may also include a processor. Each of these components may be in communication with each other.

The receiver 405 may receive information such as packets, user data, or control information associated with various information channels (e.g., control channels, data channels, and information related to MU-MIMO rate prediction based on SU SNR feedback, etc.) via communication link 420. Information received at the receiver 405 may be passed on to the MU-MIMO rate prediction component 410 via communication link 425, and to other components of wireless device 400.

The MU-MIMO rate prediction component 410 may be an example of the MU-MIMO rate prediction component 130 described in FIG. 1. The MU-MIMO rate prediction component 410 may determine a single user bias for a wireless device based on a feedback SNR and an SNR that is based on a first MCS, determine a multi-user SNR for the wireless device based on the feedback SNR, the single user bias, a multi user loss, and a group bias, and select a second MCS based on the multi-user SNR. In one embodiment, components, for example as show in FIGS. 2-4 MU-MIMO rate prediction component 410 may include a circuit or circuitry for accomplishing each of these functions.

The transmitter 415 may transmit signals received from other components of wireless device 400 via communication link 430. The transmitter 415 may transmit signals via communication link 435. In some examples, the transmitter 415 may be collocated with the receiver 405 in a transceiver component. The transmitter 415 may include a single antenna, or it may include a plurality of antennas. In some examples, the transmitter 415 may transmit a message to the wireless device based on the second MCS.

Figure 5:
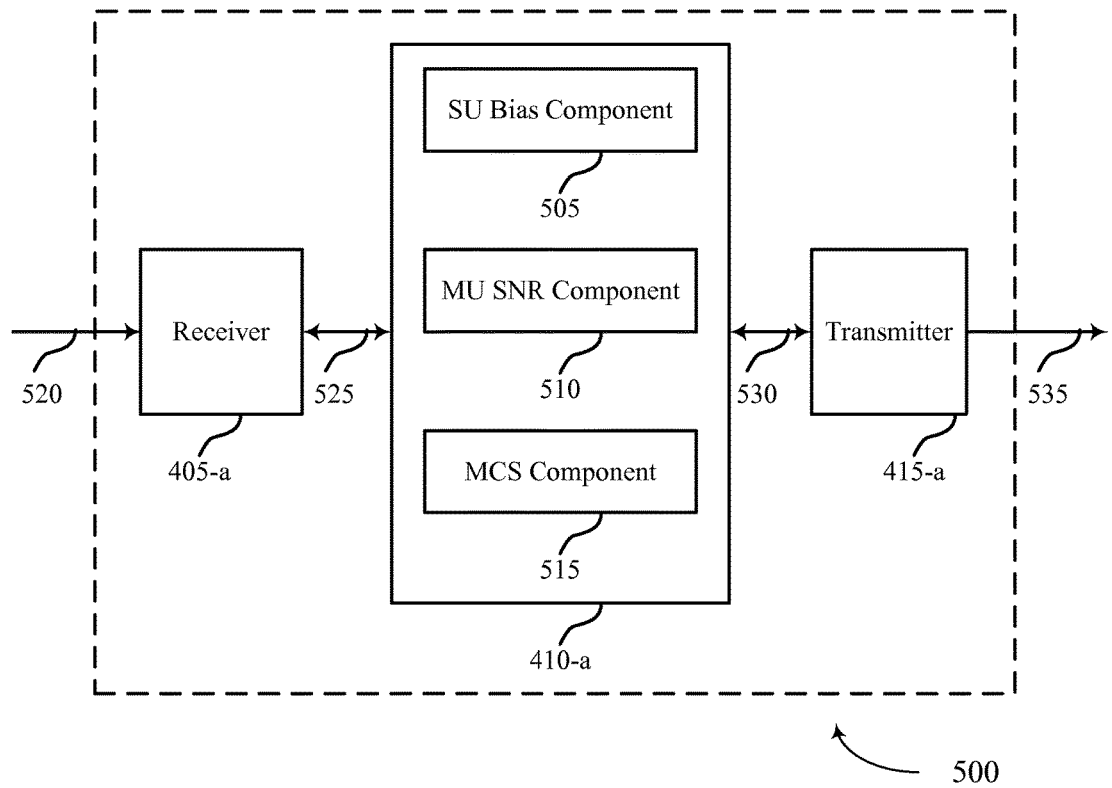

FIG. 5 shows a block diagram of a wireless device 500 for MU-MIMO rate prediction based on SU SNR feedback in accordance with various aspects of the present disclosure. Wireless device 500 may be an example of aspects of a wireless device 400 or an AP 105 described with reference to FIGS. 1-4. Wireless device 500 may include a receiver 405-*a*, a MU-MIMO rate prediction component 410-*a*, or a transmitter 415-*a*. The MU-MIMO rate prediction component 410-*a* may be an example of the MU-MIMO rate prediction component 130 described in FIG. 1 and the MU-MIMO rate prediction component described in FIG. 4. Wireless device 500 may also include a processor. Each of these components may be in communication with each other. The MU-MIMO rate prediction component 410-*a* may also include a SU bias component 505, a MU SNR component 510, and an MCS component 515.

The receiver 405-*a* may receive information via communication link 520 which may be passed on to MU-MIMO rate prediction component 410-*a* via communication link 525, and to other components of wireless device 500. The MU-MIMO rate prediction component 410-*a* may perform the operations described with reference to FIG. 4. The transmitter 415-*a* may transmit signals received from other components of wireless device 500 via communication link 530. The transmitter 415-*a* may transmit signals via communication link 535.

The SU bias component 505 may determine a single user bias for a wireless device based on a feedback SNR and an SNR that is based on a first MCS as described with reference to FIGS. 2-3. In some examples, the single user bias may be based on a previous single user bias for the wireless device and a forgetting parameter.

The multi-user SNR component 510 may determine a multi-user SNR for the wireless device based on the feedback SNR, the single user bias, a multi user loss, and a group bias as described with reference to FIGS. 2-3. In some examples, the multi-user SNR may be based on a multi-user grouping loss. The MCS component 515 may select a second MCS based on the multi-user SNR as described with reference to FIGS. 2-3. In some examples, the first MCS may be based on a packet error rate.

In one embodiment, components, for example as show in FIGS. 2-4 single user bias component 505 or MU SNR component 510 may include a circuit or circuitry for accomplishing each of these functions.

Figure 6:
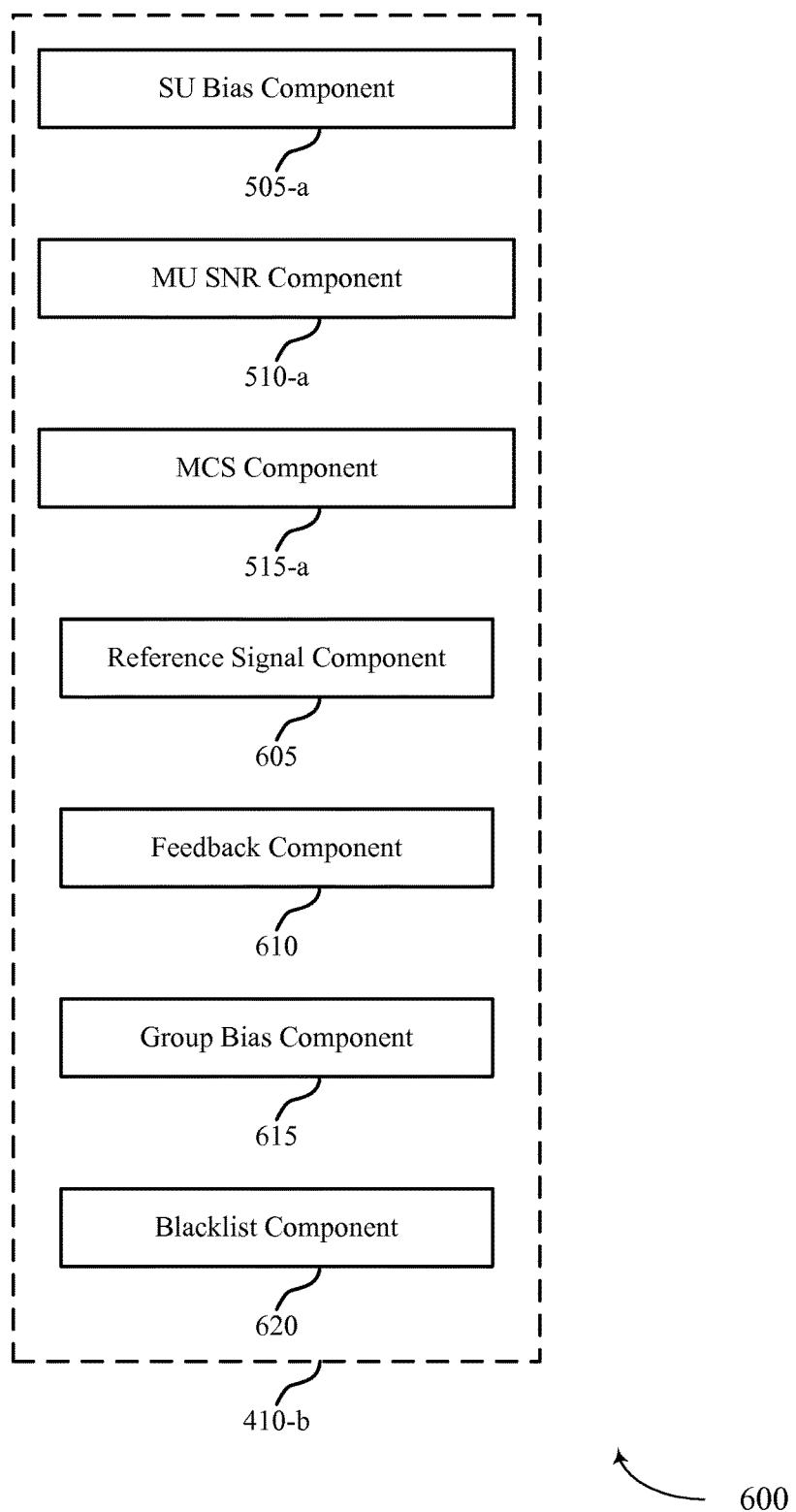

FIG. 6 shows a block diagram 600 of a MU-MIMO rate prediction component 410-*b* which may be a component of a wireless device 400 or a wireless device 500 for MU-MIMO rate prediction based on SU SNR feedback in accordance with various aspects of the present disclosure. The MU-MIMO rate prediction component 410-*b* may be an example of aspects of a MU-MIMO rate prediction component 130, 410 described with reference to FIGS. 1, 4-5. The MU-MIMO rate prediction component 410-*b* may include a SU bias component 505-*a*, a MU SNR component 510-*a*, and an MCS component 515-*a*. Each of these components may perform the functions described with reference to FIG. 5. The MU-MIMO rate prediction component 410-*b* may also include a reference signal component 605, a feedback component 610, a group bias component 615, and a blacklist component 620.

The reference signal component 605 may transmit a reference signal to the wireless device as described with reference to FIGS. 2-3. The feedback component 610 may receive a compressed beamforming feedback report from the wireless device based on the reference signal, where the feedback SNR is based on the compressed beamforming feedback report as described with reference to FIGS. 2-3.

The group bias component 615 may determine that the one or more parameters exceeds a threshold as described with reference to FIGS. 2-3. In some examples, the group bias may be based on a packet error rate of a group including the wireless device. In some examples, the group bias may be based on a previous group bias and a forgetting parameter.

The blacklist component 620 may refrain from scheduling the multi-user group based on the determination that the one or more parameters exceeds the threshold as described with reference to FIGS. 2-3. The blacklist component 620 may also maintain a blacklist including the multi-user group. The blacklist component 620 may also determine that a number of groups in the blacklist exceeds a list threshold. The blacklist component 620 may also remove the multi-user group from the blacklist based on an order the multi-user group was entered into the blacklist.

In one embodiment, components, for example as show in FIGS. 2-4, reference signal component 605, feedback component 610, group bias component 615 or blacklist component 620 may include a circuit or circuitry for accomplishing each of these functions.

Figure 7:
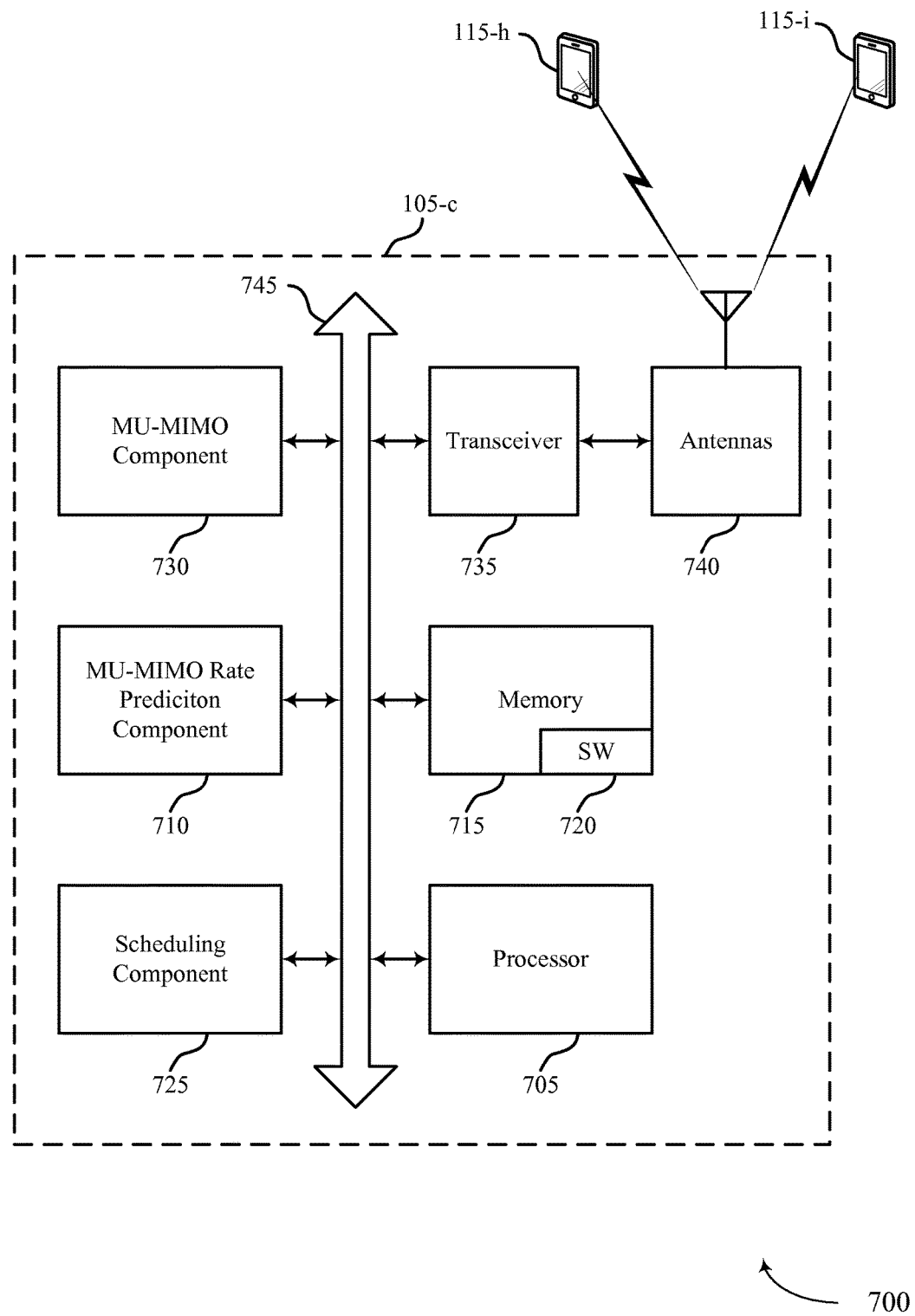
FIG. 7 illustrates a block diagram of a system including an AP that supports MU-MIMO rate prediction based on SU SNR feedback in accordance with various aspects of the present disclosure.

FIG. 7 shows a diagram of a system 700 including an AP 105 configured for MU-MIMO rate prediction based on SU SNR feedback in accordance with various aspects of the present disclosure. Specifically, system 700 may include AP 105-*c*, which may be an example of a wireless device 400, a wireless device 500, or an AP 105 as described with reference to FIGS. 1, 2 and 4-6. AP 105-*c* may include a MU-MIMO rate prediction component 710, which may be an example of a MU-MIMO rate prediction component described with reference to FIGS. 1, 4-6. AP 105-*c* may also include components for bi-directional voice and data communications including components for transmitting communications and components for receiving communications. For example, AP 105-*c* may communicate bi-directionally with STA 115-*h* or STA 115-*i*.

AP 105-*c* may also include a processor 705, and memory 715 (including software (SW)) 720, a transceiver 735, and one or more antenna(s) 740, each of which may communicate, directly or indirectly, with one another (e.g., via buses 745). The transceiver 735 may communicate bi-directionally, via the antenna(s) 740 or wired or wireless links, with one or more networks, as described above. For example, the transceiver 735 may communicate bi-directionally with another AP 105 or a STA 115. The transceiver 735 may include a modem to modulate the packets and provide the modulated packets to the antenna(s) 740 for transmission, and to demodulate packets received from the antenna(s) 740. While AP 105-*c* may include a single antenna 740, AP 105-*c* may also have multiple antennas 740 capable of concurrently transmitting or receiving multiple wireless transmissions.

The memory 715 may include random access memory (RAM) and read only memory (ROM). The memory 715 may store computer-readable, computer-executable software/firmware code 720 including instructions that, when executed, cause the processor 705 to perform various functions described herein (e.g., MU-MIMO rate prediction based on SU SNR feedback, etc.). Alternatively, the software/firmware code 720 may not be directly executable by the processor 705 but cause a computer (e.g., when compiled and executed) to perform functions described herein. The processor 705 may include an intelligent hardware device, (e.g., a central processing unit (CPU), a microcontroller, an application specific integrated circuit (ASIC), etc.)

AP 105-*c* may also include a MU-MIMO component 725 which may enable MU-MIMO operations as described above. AP 105-*c* may also include a scheduling component 730, which may schedule communications with one or more STAs 115 or groups of STAs 115.

The components of wireless device 400, wireless device 500, and MU-MIMO rate prediction component 130, 410, and the components of system 700 may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
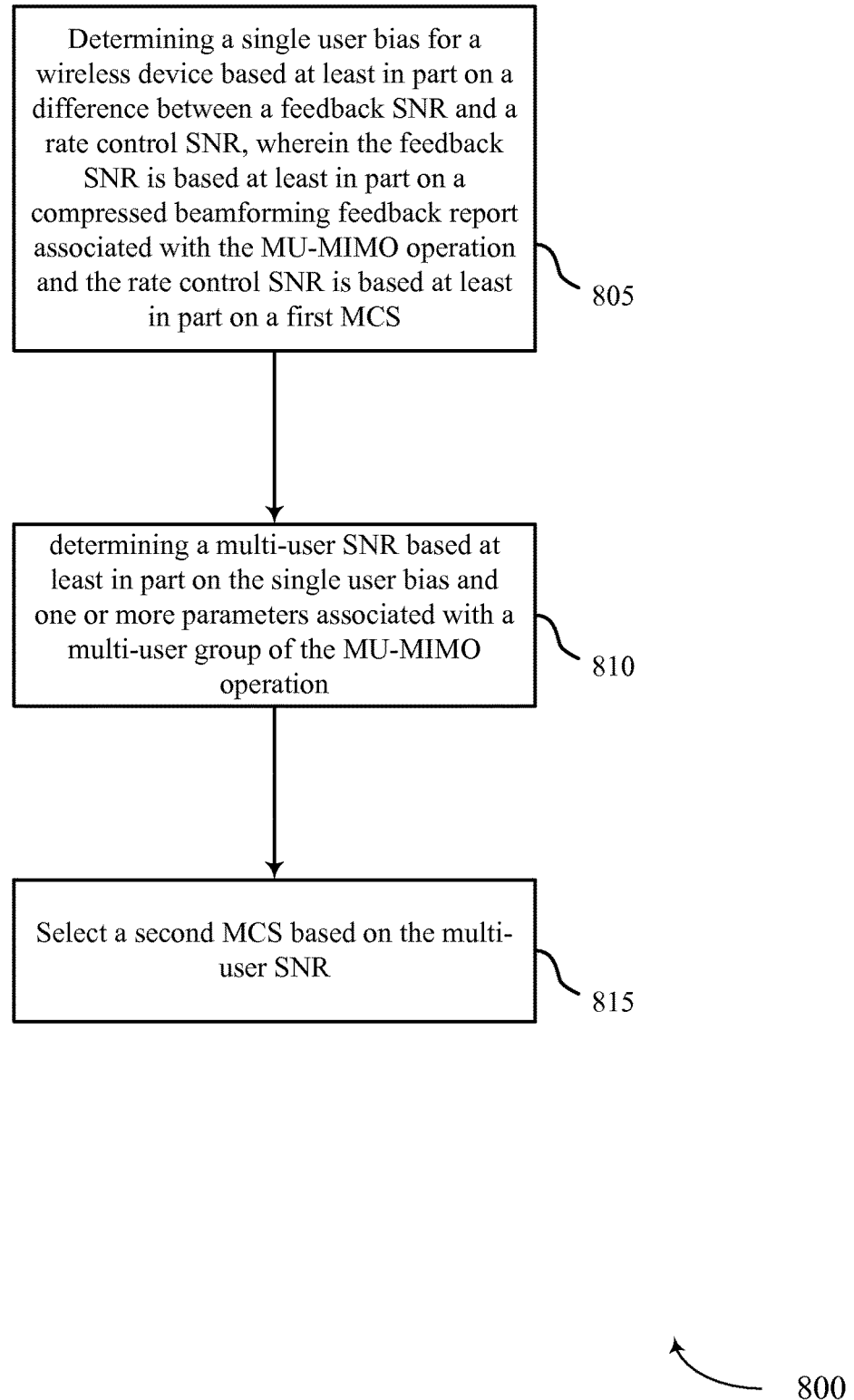
FIGS. 8-11 illustrate methods for MU-MIMO rate prediction based on SU SNR feedback in accordance with various aspects of the present disclosure.

FIG. 8 shows a flowchart illustrating a method 800 for MU-MIMO rate prediction based on SU SNR feedback in accordance with various aspects of the present disclosure. The operations of method 800 may be implemented by an AP 105 or its components as described with reference to FIGS. 1-7. For example, the operations of method 800 may be performed by the MU-MIMO rate prediction component 410 as described with reference to FIGS. 4-7. In some examples, an AP 105 may execute a set of codes to control the functional elements of the AP 105 to perform the functions described below. Additionally or alternatively, the AP 105 may perform aspects the functions described below using special-purpose hardware.

At block 805, the AP 105 may determine a single user bias for a wireless device based on a feedback SNR and an SNR that is based on a first MCS as described with reference to FIGS. 2-3. In certain examples, the operations of block 805 may be performed by the SU bias component 505 as described with reference to FIG. 5.

At block 810, the AP 105 may determine a multi-user SNR for the wireless device based on the feedback SNR, the single user bias, a multi user loss, and a group bias as described with reference to FIGS. 2-3. In certain examples, the operations of block 810 may be performed by the MU SNR component 510 as described with reference to FIG. 5.

At block 815, the AP 105 may select a second MCS based on the multi-user SNR as described with reference to FIGS. 2-3. In certain examples, the operations of block 815 may be performed by the MCS component 515 as described with reference to FIG. 5.

Figure 9:
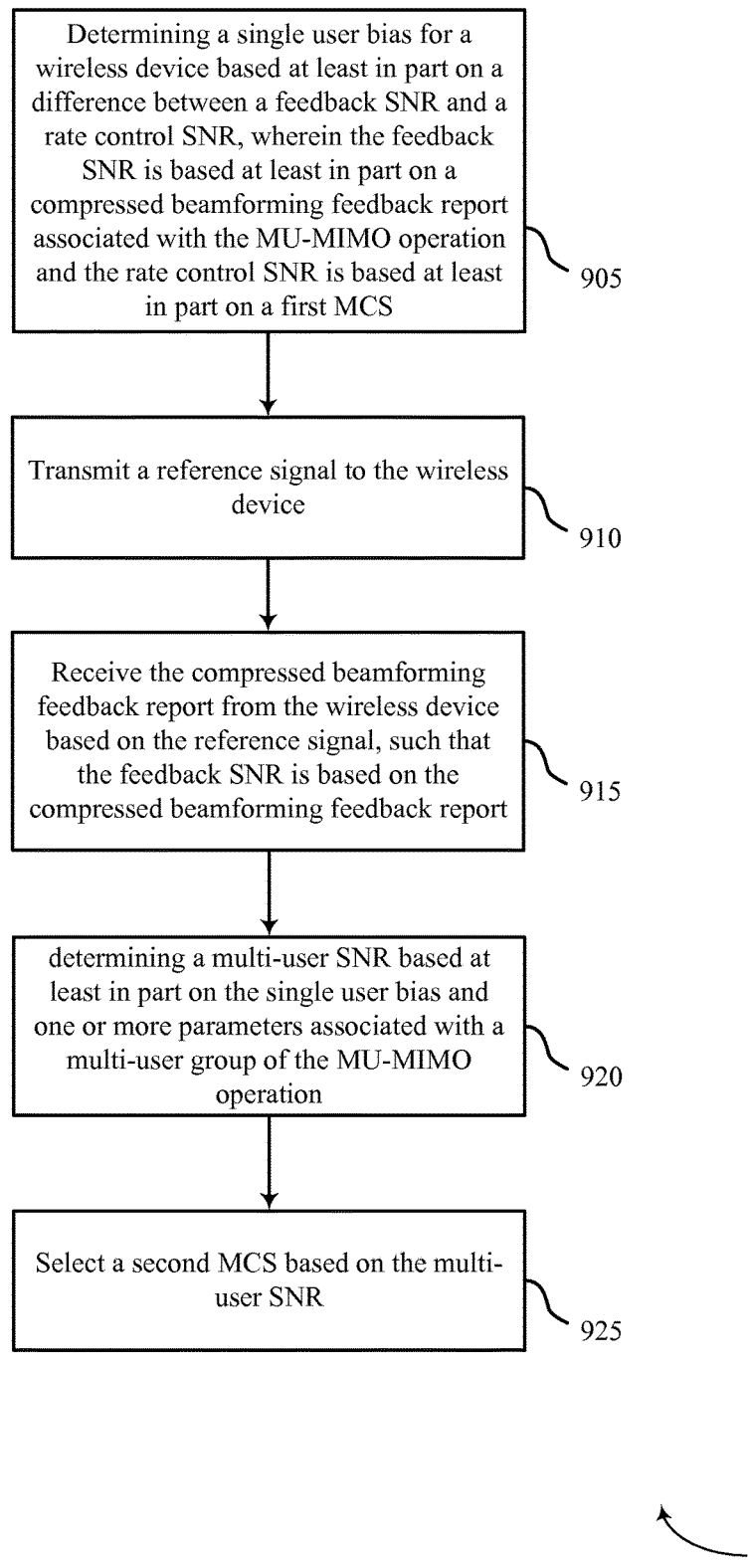

FIG. 9 shows a flowchart illustrating a method 900 for MU-MIMO rate prediction based on SU SNR feedback in accordance with various aspects of the present disclosure. The operations of method 900 may be implemented by an AP 105 or its components as described with reference to FIGS. 1-7. For example, the operations of method 900 may be performed by the MU-MIMO rate prediction component 410 as described with reference to FIGS. 4-7. In some examples, an AP 105 may execute a set of codes to control the functional elements of the AP 105 to perform the functions described below. Additionally or alternatively, the AP 105 may perform aspects the functions described below using special-purpose hardware. The method 900 may also incorporate aspects of method 800 of FIG. 8.

At block 905, the AP 105 may determine a single user bias for a wireless device based on a feedback SNR and an SNR that is based on a first MCS as described with reference to FIGS. 2-3. In certain examples, the operations of block 905 may be performed by the SU bias component 505 as described with reference to FIG. 5.

At block 910, the AP 105 may transmit a reference signal to the wireless device as described with reference to FIGS. 2-3. In certain examples, the operations of block 910 may be performed by the reference signal component 605 as described with reference to FIG. 6.

At block 915, the AP 105 may receive a compressed beamforming feedback report from the wireless device based on the reference signal, where the feedback SNR is based on the compressed beamforming feedback report as described with reference to FIGS. 2-3. In certain examples, the operations of block 915 may be performed by the feedback component 610 as described with reference to FIG. 6.

At block 920, the AP 105 may determine a multi-user SNR for the wireless device based on the feedback SNR, the single user bias, a multi user loss, and a group bias as described with reference to FIGS. 2-3. In certain examples, the operations of block 920 may be performed by the MU SNR component 510 as described with reference to FIG. 5.

At block 925, the AP 105 may select a second MCS based on the multi-user SNR as described with reference to FIGS. 2-3. In certain examples, the operations of block 925 may be performed by the MCS component 515 as described with reference to FIG. 5.

Figure 10:
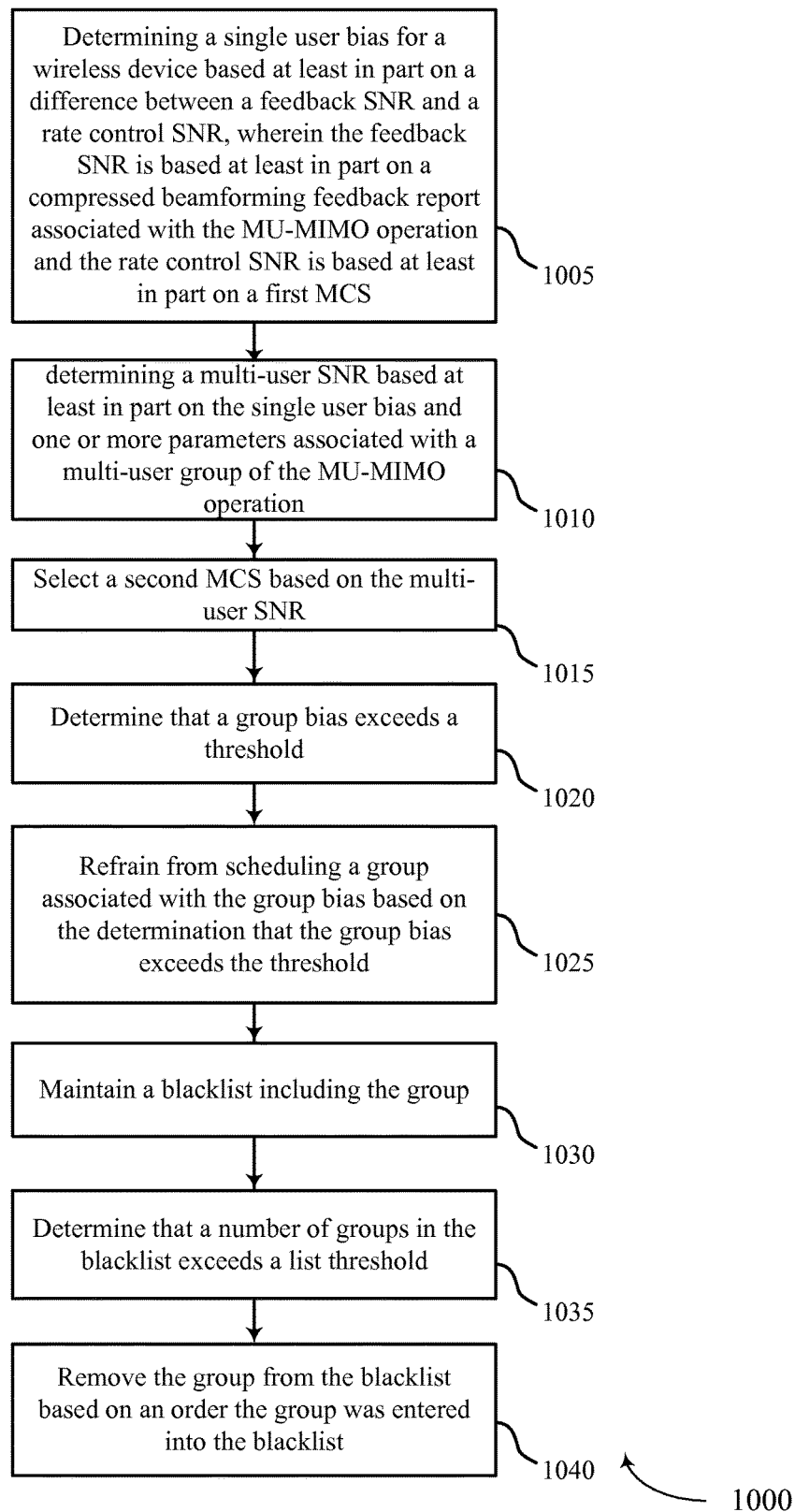

FIG. 10 shows a flowchart illustrating a method 1000 for MU-MIMO rate prediction based on SU SNR feedback in accordance with various aspects of the present disclosure. The operations of method 1000 may be implemented by an AP 105 or its components as described with reference to FIGS. 1-7. For example, the operations of method 1000 may be performed by the MU-MIMO rate prediction component 410 as described with reference to FIGS. 4-7. In some examples, an AP 105 may execute a set of codes to control the functional elements of the AP 105 to perform the functions described below. Additionally or alternatively, the AP 105 may perform aspects the functions described below using special-purpose hardware. The method 1000 may also incorporate aspects of methods 800, and 900 of FIGS. 8-9.

At block 1005, the AP 105 may determine a single user bias for a wireless device based on a feedback SNR and an SNR that is based on a first MCS as described with reference to FIGS. 2-3. In certain examples, the operations of block 1005 may be performed by the SU bias component 505 as described with reference to FIG. 5.

At block 1010, the AP 105 may determine a multi-user SNR for the wireless device based on the feedback SNR, the single user bias, a multi user loss, and a group bias as described with reference to FIGS. 2-3. In certain examples, the operations of block 1010 may be performed by the MU SNR component 510 as described with reference to FIG. 5.

At block 1015, the AP 105 may select a second MCS based on the multi-user SNR as described with reference to FIGS. 2-3. In certain examples, the operations of block 1015 may be performed by the MCS component 515 as described with reference to FIG. 5.

At block 1020, the AP 105 may determine that the one or more parameters exceeds a threshold as described with reference to FIGS. 2-3. In certain examples, the operations of block 1020 may be performed by the group bias component 615 as described with reference to FIG. 6.

At block 1025, the AP 105 may refrain from scheduling the multi-user group based on the determination that the one or more parameters exceeds the threshold as described with reference to FIGS. 2-3. In certain examples, the operations of block 1025 may be performed by the blacklist component 620 as described with reference to FIG. 6.

At block 1030, the AP 105 may maintain a blacklist including the multi-user group as described with reference to FIGS. 2-3. In certain examples, the operations of block 1030 may be performed by the blacklist component 620 as described with reference to FIG. 6.

At block 1035, the AP 105 may determine that a number of groups in the blacklist exceeds a list threshold as described with reference to FIGS. 2-3. In certain examples, the operations of block 1035 may be performed by the blacklist component 620 as described with reference to FIG. 6.

At block 1040, the AP 105 may remove the multi-user group from the blacklist based on an order the multi-user group was entered into the blacklist as described with reference to FIGS. 2-3. In certain examples, the operations of block 1040 may be performed by the blacklist component 620 as described with reference to FIG. 6.

Figure 11:
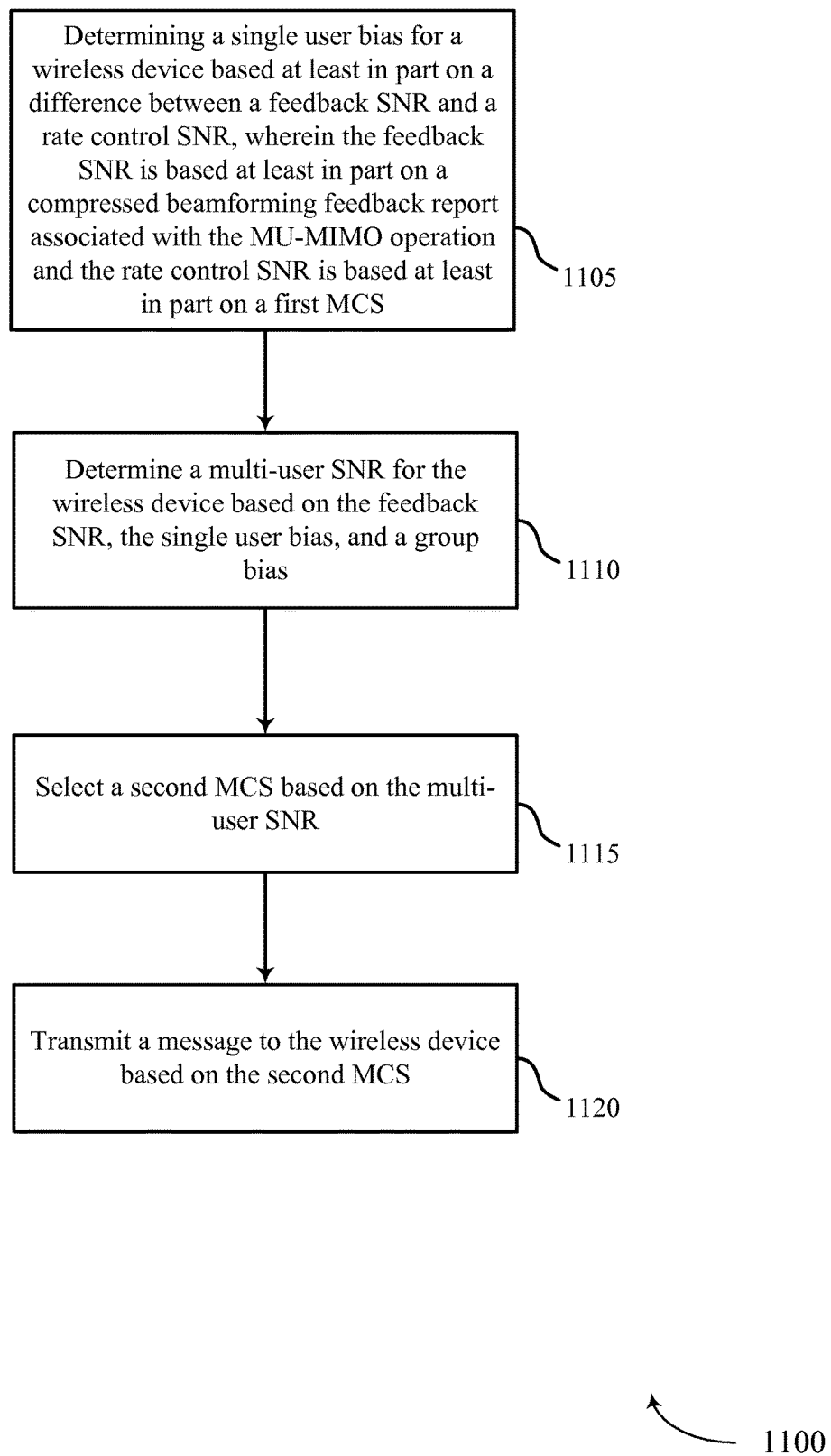

FIG. 11 shows a flowchart illustrating a method 1100 for MU-MIMO rate prediction based on SU SNR feedback in accordance with various aspects of the present disclosure. The operations of method 1100 may be implemented by an AP 105 or its components as described with reference to FIGS. 1-7. For example, the operations of method 1100 may be performed by the MU-MIMO rate prediction component 410 as described with reference to FIGS. 4-7. In some examples, an AP 105 may execute a set of codes to control the functional elements of the AP 105 to perform the functions described below. Additionally or alternatively, the AP 105 may perform aspects the functions described below using special-purpose hardware. The method 1100 may also incorporate aspects of methods 800, 900, and 1000 of FIGS. 8-10.

At block 1105, the AP 105 may determine a single user bias for a wireless device based on a feedback SNR and an SNR that is based on a first MCS as described with reference to FIGS. 2-3. In certain examples, the operations of block 1105 may be performed by the SU bias component 505 as described with reference to FIG. 5.

At block 1110, the AP 105 may determine a multi-user SNR for the wireless device based on the feedback SNR, the single user bias, a multi user loss, and a group bias as described with reference to FIGS. 2-3. In certain examples, the operations of block 1110 may be performed by the MU SNR component 510 as described with reference to FIG. 5.

At block 1115, the AP 105 may select a second MCS based on the multi-user SNR as described with reference to FIGS. 2-3. In certain examples, the operations of block 1115 may be performed by the MCS component 515 as described with reference to FIG. 5.

At block 1120, the AP 105 may transmit a message to the wireless device based on the second MCS as described with reference to FIGS. 2-3. In certain examples, the operations of block 1120 may be performed by the transmitter 415 as described with reference to FIG. 4.

Thus, methods 800, 900, 1000, and 1100 may provide for MU-MIMO rate prediction based on SU SNR feedback. It should be noted that methods 800, 900, 1000, and 1100 describe possible implementation, and that the operations and the steps may be rearranged or otherwise modified such that other implementations are possible. In some examples, aspects from two or more of the methods 800, 900, 1000, and 1100 may be combined.

Figure 12:
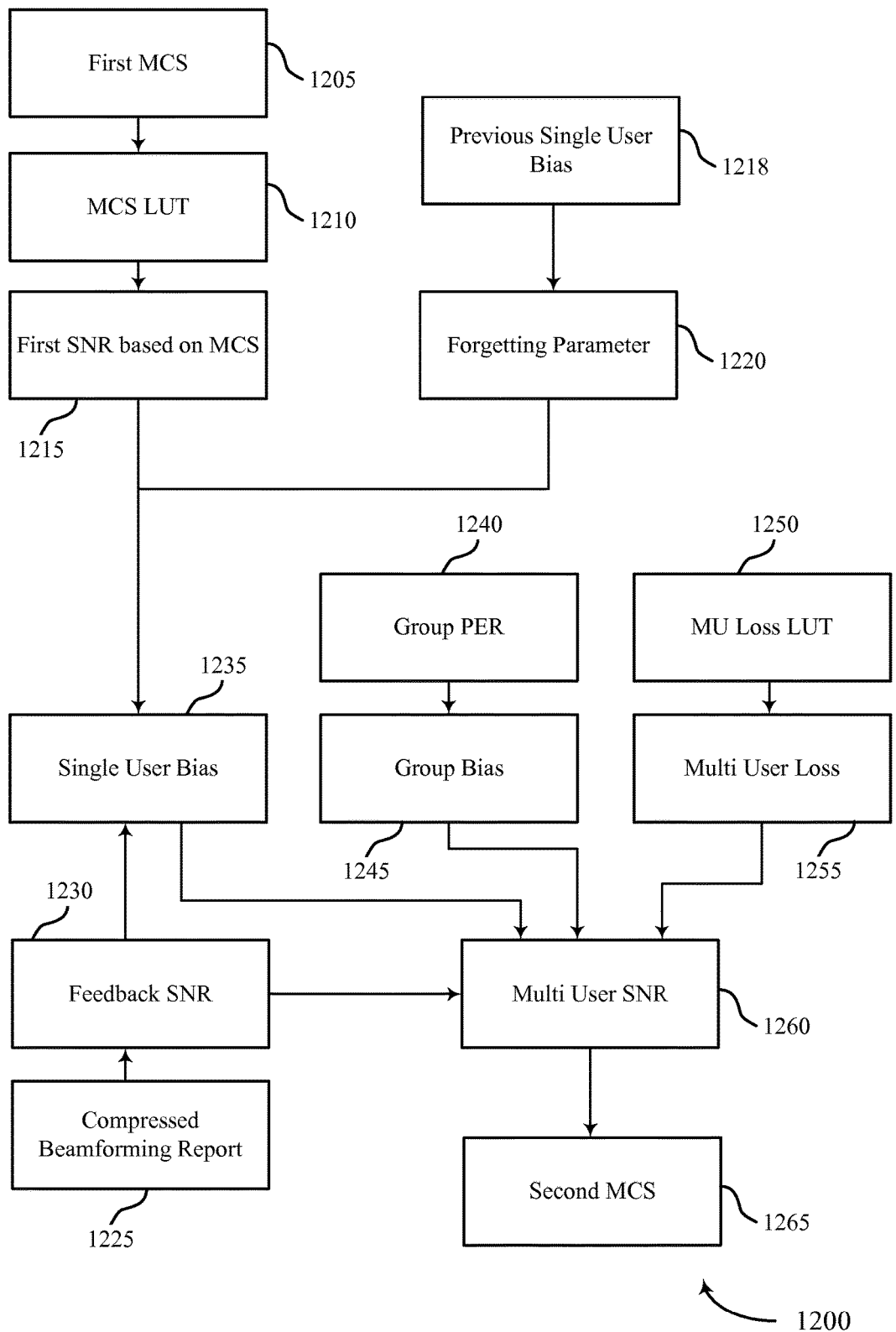
FIG. 12 shows process flow for MU-MIMO rate prediction based on SU SNR feedback as described herein.

FIG. 12 shows process flow 1200 for MU-MIMO rate prediction based on SU SNR feedback as described herein. That is, process flow 1200 may represent flow for selecting an MCS based on a feedback SNR, and other parameters as described herein. The selected MCS may be based on a single user bias and a group bias. Each bias may represent a difference between an SNR that is being used as a basis for the MCS and computed using a rate of errors detected, and an MCS computed using a compressed feedback report.

First MCS 1205 may be based on a current MCS used for communication with a STA 115 and an AP 105 (or between other wireless devices). The first MCS 1205 may be based on a PER detected for communications with a STA 115. MCS look up table (LUT) 1210 may be used to determine first SNR 1215 based on first MCS 1205.

Forgetting parameter 1220, or a, may represent a parameter used to modify how much a predicted single user bias changes from one computation period to the next. That is, new estimate for the single user bias may be multiplied by a and the existing single user bias (i.e., the previous single user bias 1218, relative to the current computation) may be multiplied by the factor (1−α). So, for example, if α is 1, the new single user bias may be based on the new estimate, whereas if α is 0, the new estimate would be the same as the existing bias. If α is 0.5, the average of the new estimate and the previous bias would be used for the new bias.

A compressed beamforming report 1225 may represent phase information for antennas of beamformee (i.e., a STA 115) that is provided to a beamformer (i.e., a STA 115). The compressed beamforming report 1225 may be based on a reference signal transmitted by the AP 105 to the STA 115. The compressed beamforming report 1225 may be used to compute a feedback SNR 1230.

The first SNR 1215, the previous single user bias 1218, the forgetting parameter 1220, and the feedback SNR 1230 may be used to compute a single user bias 1235 according to the algorithm described above with reference to FIG. 2.

A group PER 1240 may represent a measured number of packet errors while transmitting using a beamforming configuration for a group of STAs 115. A group bias 1245 may be computed based on the group PER 1240. A multi-user LUT 1250 may also be used to identify a multi-user loss 1255. The multi-user loss 1255 may then be combined with the group bias 1245, the single user bias 1235, and the feedback SNR 1230 to compute a multi-user SNR 1260. The multi-user SNR 1260 may then be used to determine a second MCS 1265. In some cases, the second MCS 1265 may result in improved communication efficiency between the STA 115 and AP 105 compared to using the first MCS 1205. That is, it may enable a higher MCS to be used, thereby increasing throughput, or a lower MCS may be used to decrease an error rate.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection may be termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication in a system utilizing multi-user multiple-input, multiple-output (MU-MIMO) operation, comprising:
    determining a single user bias for a wireless device based at least in part on a difference between a feedback signal-to-noise ratio (SNR) and a rate control SNR, wherein the feedback SNR is based at least in part on a compressed beamforming feedback report associated with the MU-MIMO operation and the rate control SNR is based at least in part on a first modulation and coding scheme (MCS), and wherein the single user bias comprises an SNR offset based at least in part on an SNR of a single user;
    determining a multi-user SNR based at least in part on the single user bias and one or more parameters associated with a multi-user group of the MU-MIMO operation;
    selecting a second MCS based at least in part on the multi-user SNR; and
    transmitting a message to the wireless device based at least in part on the second MCS.

2. The method of claim 1, further comprising:
    transmitting a reference signal to the wireless device; and
    receiving the compressed beamforming feedback report from the wireless device based at least in part on the reference signal.

3. The method of claim 1, further comprising:
    determining that the one or more parameters exceeds a threshold; and
    refraining from scheduling the multi-user group based at least in part on the determination that the one or more parameters exceeds the threshold.

4. The method of claim 3, further comprising:
    maintaining a blacklist comprising the multi-user group;
    determining that a number of groups in the blacklist exceeds a list threshold; and
    removing the multi-user group from the blacklist based at least in part on an order the multi-user group was entered into the blacklist.

5. The method of claim 1, wherein the message is transmitted to the wireless device using the second MCS.

6. The method of claim 1, wherein the single user bias is based at least in part on a combination of a previous single user bias and an updated single user bias estimate weighted according to a forgetting parameter.

7. The method of claim 1, wherein the first MCS is based at least in part on a packet error rate detected for communications with the wireless device.

8. The method of claim 1, wherein the multi-user SNR is based at least in part on a multi-user grouping loss.

9. The method of claim 1, wherein the one or more parameters comprises a group bias based at least in part on a packet error rate of the multi-user group, wherein the group bias comprises an SNR offset based at least in part on a packet error rate (PER) of a group of users.

10. The method of claim 1, wherein the one or more parameters comprises a group bias based at least in part on a previous group bias and a forgetting parameter, wherein the group bias comprises an SNR offset based at least in part on a packet error rate (PER) of a group of users.

11. An apparatus for wireless communication in a system utilizing multi-user multiple-input, multiple-output (MU-MIMO) operation, comprising:
    a single user bias component for determining a single user bias for a wireless device based at least in part on a difference between a feedback signal-to-noise ratio (SNR) and a rate control SNR, wherein the feedback SNR is based at least in part on a compressed beamforming feedback report associated with the MU-MIMO operation and the rate control SNR is based at least in part on a first modulation and coding scheme (MCS), and wherein the single user bias comprises an SNR offset based at least in part on an SNR of a single user;
    a multi-user SNR component for determining a multi-user SNR based at least in part on the single user bias and one or more parameters associated with a multi-user group of the MU-MIMO operation;
    a modulation and coding scheme component for selecting a second MCS based at least in part on the multi-user SNR; and
    a transmitting component for transmitting a message to the wireless device based at least in part on the second MCS.

12. The apparatus of claim 11, further comprising:
    a reference signal component for transmitting a reference signal to the wireless device; and
    a feedback component for receiving the compressed beamforming feedback report from the wireless device based at least in part on the reference signal.

13. The apparatus of claim 11, further comprising:
    a group bias component for determining that the one or more parameters exceeds a threshold, wherein the group bias comprises an SNR offset based at least in part on a packet error rate (PER) of a group of users; and a blacklist component for refraining from scheduling the multi-user group based at least in part on the determination that the one or more parameters exceeds the threshold.

14. The apparatus of claim 13, further comprising:
the blacklist component for maintaining a blacklist comprising the multi-user group;
the blacklist component for determining that a number of groups in the blacklist exceeds a list threshold; and
the blacklist component for removing the multi-user group from the blacklist based at least in part on an order the multi-user group was entered into the blacklist.

15. An apparatus for wireless communication in a system utilizing multi-user multiple-input, multiple-output (MU-MIMO) operation, comprising:
a processor;
memory in electronic communication with the processor; and
instructions stored in the memory and operable, when executed by the processor, to cause the apparatus to:
determine a single user bias for a wireless device based at least in part on a difference between a feedback signal-to-noise ratio (SNR) and a rate control SNR, wherein the feedback SNR is based at least in part on a compressed beamforming feedback report associated with the MU-MIMO operation and the rate control SNR is based at least in part on a first modulation and coding scheme (MCS), and wherein the single user bias comprises an SNR offset based at least in part on an SNR of a single user;
determine a multi-user SNR based at least in part on the single user bias and one or more parameters associated with a multi-user group of the MU-MIMO operation;
select a second MCS based at least in part on the multi-user SNR; and
transmit a message to the wireless device based at least in part on the second MCS.

16. The apparatus of claim 15, wherein the instructions are operable to cause the apparatus to:
transmit a reference signal to the wireless device; and
receive the compressed beamforming feedback report from the wireless device based at least in part on the reference signal.

17. The apparatus of claim 15, wherein the instructions are operable to cause the apparatus to:
determine that the one or more parameters exceeds a threshold; and
refrain from scheduling the multi-user group based at least in part on the determination that the one or more parameters exceeds the threshold.

18. The apparatus of claim 17, wherein the instructions are operable to cause the apparatus to:
maintain a blacklist comprising the multi-user group;
determine that a number of groups in the blacklist exceeds a list threshold; and
remove the multi-user group from the blacklist based at least in part on an order the multi-user group was entered into the blacklist.

19. The apparatus of claim 15, wherein the instructions are operable to cause the apparatus to:
transmit the message to the wireless device using the second MCS.

20. The apparatus of claim 15, wherein the single user bias is based at least in part on a combination of a previous single user bias and an updated single user bias estimate weighted according to a forgetting parameter.

21. The apparatus of claim 15, wherein the first MCS is based at least in part on a packet error rate detected for communications with the wireless device.

22. The apparatus of claim 15, wherein the multi-user SNR is based at least in part on a multi-user grouping loss.

23. The apparatus of claim 15, wherein the one or more parameters comprises a group bias based at least in part on a packet error rate of the multi-user group, and wherein the group bias comprises an SNR offset based at least in part on a packet error rate (PER) of a group of users.

24. The apparatus of claim 15, wherein the one or more parameters comprises a group bias based at least in part on a previous group bias and a forgetting parameter, and wherein the group bias comprises an SNR offset based at least in part on a packet error rate (PER) of a group of users.

25. A non-transitory computer-readable medium storing code for wireless communication in a system utilizing multi-user multiple-input, multiple-output (MU-MIMO) operation, the code comprising instructions executable to:
determine a single user bias for a wireless device based at least in part on a difference between a feedback signal-to-noise ratio (SNR) and a rate control SNR, wherein the feedback SNR is based at least in part on a compressed beamforming feedback report associated with the MU-MIMO operation and the rate control SNR is based at least in part on a first modulation and coding scheme (MCS), and wherein the single user bias comprises an SNR offset based at least in part on an SNR of a single user;
determine a multi-user SNR based at least in part on the single user bias and one or more parameters associated with a multi-user group of the MU-MIMO operation;
select a second MCS based at least in part on the multi-user SNR; and
transmit a message to the wireless device based at least in part on the second MCS.

26. The non-transitory computer-readable medium of claim 25, wherein the instructions are executable to:
transmit a reference signal to the wireless device; and
receive the compressed beamforming feedback report from the wireless device based at least in part on the reference signal.

27. The non-transitory computer-readable medium of claim 25, wherein the instructions are executable to:
determine that the one or more parameters exceeds a threshold; and
refrain from scheduling the multi-user group based at least in part on the determination that the one or more parameters exceeds the threshold.

28. The non-transitory computer-readable medium of claim 27, wherein the instructions are executable to:
maintain a blacklist comprising the multi-user group;
determine that a number of groups in the blacklist exceeds a list threshold; and
remove the multi-user group from the blacklist based at least in part on an order the multi-user group was entered into the blacklist.

29. The non-transitory computer-readable medium of claim 25, wherein the instructions are executable to:
transmit the message to the wireless device using the second MCS.

30. The non-transitory computer-readable medium of claim 25, wherein the single user bias is based at least in part on a combination of a previous single user bias and an updated single user bias estimate weighted according to a forgetting parameter.

* * * * *